United States Patent Office 3,010,887
Patented Nov. 28, 1961

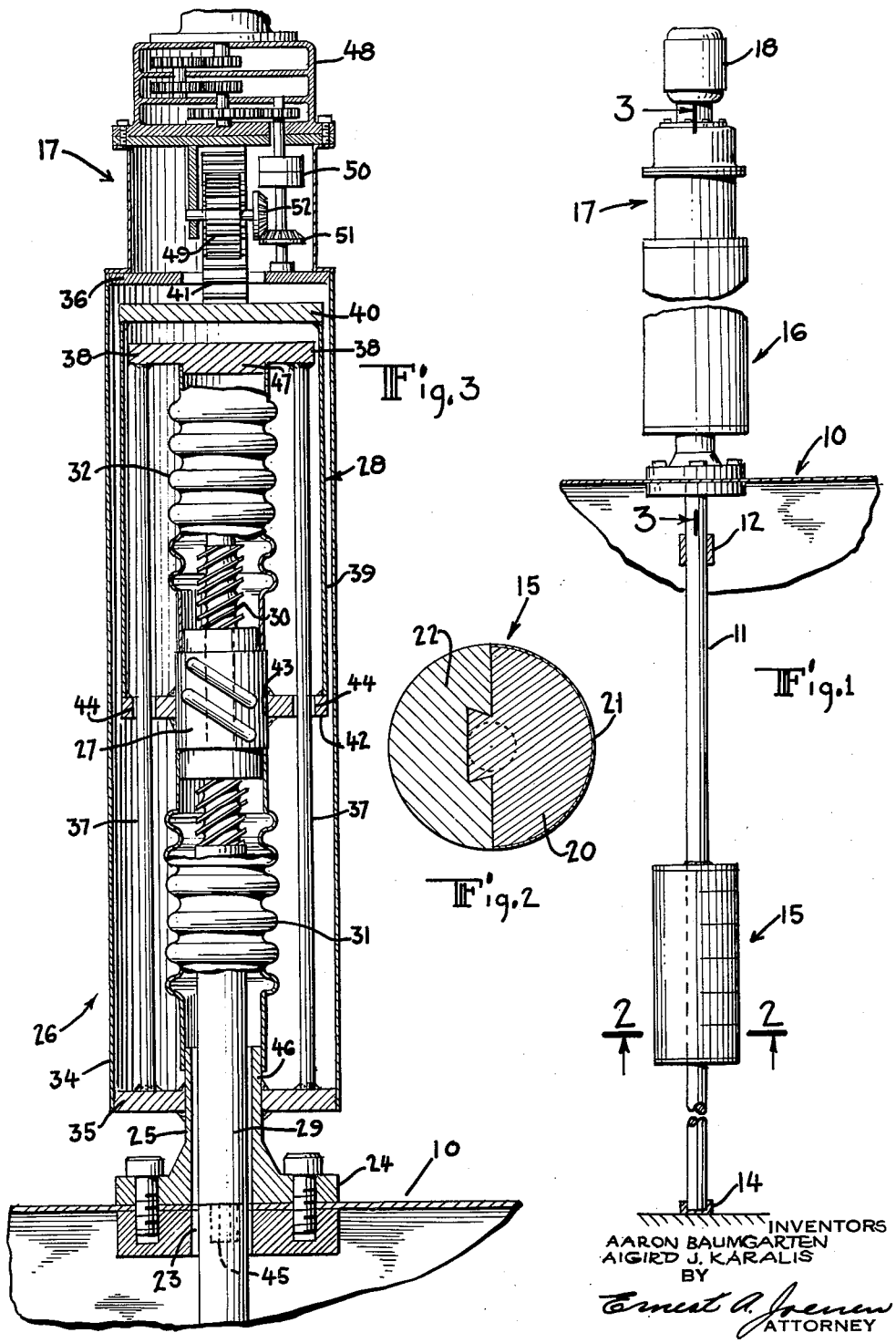

3,010,887
CONTROL ROD ROTATING MECHANISM
Aaron Baumgarten, Massapequa, and Algird J. Karalis, Uniondale, N.Y., assignors, by mesne assignments, to the United States of America as represented by the Secretary of the Army
Filed Nov. 8, 1957, Ser. No. 695,249
1 Claim. (Cl. 204—193.2)

The present invention relates to nuclear reactors, and, more particularly, to mechanism for imparting rotary movement to the control rods of the reactors to place the rods in various positions.

The present invention is primarily concerned with positioning the control rods of gas-cooled nuclear reactors operating at high temperature and pressure. In order to insure satisfactory operation and minimum maintenance for the control rods, it is necessary to place the control rod positioning mechanism in a low temperature region. This creates the problem of driving the control rods, which by the nature of nuclear reactors must operate within the hot core of the reactor, from some location outside of the reactor pressure vessel wall. This requirement, in turn, creates the problem of devising a seal which would permit rotating the control rods and which, at the same time, would completely eliminate leakage of reactor gas. Heretofore, no such satisfactory seal has been devised.

Accordingly, an object of the present invention is to provide mechanism for positioning the control rods of nuclear reactors which is located outside of the reactor in a low temperature region and has an absolute zero leakage rate.

Another object is to provide such mechanism which effects predictable and reproducible rotary motion of the control rods.

Another object is to provide such mechanism which can be constructed of proven components which are readily assembled.

A further object is to accomplish the foregoing in a simple, practical and economical manner.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a side elevational view illustrating a portion of a nuclear reactor, a control rod and mechanism in accordance with the present invention for positioning the control rod.

FIG. 2 is a sectional view taken along the line 2—2 on the control rod shown in FIG. 1.

FIG. 3 is an enlarged sectional view taken along the line 3—3 on FIG. 1, illustrating the control mechanism in detail.

Referring to the drawing in detail and more particularly to FIG. 1, there is shown a portion of the top wall 10 of a nuclear reactor, a control rod shaft 11 rotatably mounted within the reactor by suitable bearings 12, and 14, a control rod 15 mounted on the control rod shaft between the bearings 12 and 14, mechanism 16 for effecting rotary movement of the control rod shaft and the control rod thereon for the purpose about to be described, and a drive 17 for the mechanism including a motor 18.

As shown in FIG. 2, the control rod 15 is generally cylindrical and is suitably secured onto the control rod shaft for rotary movement therewith. The control rod is of the type which has a steel segment 20 at about one half of its circumference which is shown clad with a neutron absorbing material 21 and has a neutron reflector 22, exposed at the remainder of its surface. In order to attain the desired degree of control of the reactor, the control rod is rotated in either direction to present the reflector and/or the neutron absorbing surface to the core of the reactor.

As shown in FIG. 3, the wall 10 is provided with an opening 23 about which a flange 24 is secured having a sleeve-like formation 25 extending outwardly from the wall to facilitate securement of the mechanism 16 to the reactor wall or other methods of connection may be used.

Generally described, the mechanism 16 comprises a support 26, a motion transmitting nut 27, a yoke 28 for moving the nut axially, a shaft 29 coupled to or integral with the control rod shaft 11 at one end thereof and formed with a screw 30 at its other end which cooperates with the nut to effect rotary motion of the shaft, and flexible seals 31 and 32 for the nut and the shaft.

The support 26, as shown herein, comprises a tube 34, apertured plates 35 and 36 secured to the ends of the tube 34, two or more tie rods 37 having one end secured to the end plate 35 and extending axially within the tube, and a disc 38 secured to and supported by the other end of the tie rods and spaced inwardly of the end plate 36.

The yoke 28 comprises a sleeve 39 positioned in the tube 34, a plate 40 at one end of the sleeve positioned between the end plate 36 and the disc 38 having an axial extending rack 41 thereon which passes through and beyond the aperture in the end plate 36, and a plate 42 at the other end of the sleeve having a central aperture 43 in which the nut is mounted and having holes 44 spaced radially from the central aperture for receiving the tie rods to slidably mount the yoke on the tie rods and be restrained against rotary movement.

The nut 27 and screw 30 arrangement is of the conventional type adapted to translate linear motion into rotary motion wherein ball bearings provide the driving connection between complementary helical grooves of the nut and the screw. If desired, any other suitable mechanism may be utilized to translate linear motion to rotary motion. As shown herein, the shaft extends through the sleeve 25 and has a hexagonal stud 45 at its free end for coupling the control rod shaft 11 thereto.

In order to facilitate sealing the wall opening 23 of the reactor and providing a seal about the shaft 29, an upper collar portion 46 of the sleeve 25 is fitted into and extends upwardly through the aperture of the end plate 35 of the support, and is sealed in the aperture by welding the same to the plate 35.

The seal 31 is a flexible tube or bellows, adapted to store energy through which the portion of the shaft between the nut and the reactor wall extends. One end of the bellows is sealed to the end of the nut facing the collar 46 by welding and the other end of the bellows is sealed to the end of the collar 46 within the support tube 34 by welding.

The seal 32 also is a flexible tube or bellows, adapted to store energy, which has one end sealed to the other end of the nut by welding and has its other end sealed to a circular boss 47 on the disc 38 by welding. Alternatively, the end of the bellows secured to the boss 47 could be sealed by any suitable closure not connected to the disc 38, but, by securing the bellows as shown herein, its free end is supported co-axially about the free end portion of the shaft having the screw thereon. In this manner the flange 24, the sleeve 25 and its collar 46, the bellows 31, the nut 27, the bellows 32, and the boss 47 provide an absolutely leakage proof seal for the reactor wall opening 22, without interfering with or complicating the motion transmitting mechanism.

The drive 17 for the yoke 28 comprises a speed reducer, such as a gear box 48, driven by the motor 18, a pinion 49 meshing with the rack 41, and a clutch 50 and bevel gears 51 and 52 for connecting the pinion 49 to the output of the gear box.

The motor 18 may be either electric, hydraulic or pneumatic and is arranged for operation in either direction.

Preferably, the clutch is of the electro-magnetic type to provide for a fail-safe feature in the control rod as described hereinafter, and, by being located in the drive between the gear box 48 and the pinion 49, enables emergency shutdown of the reactor.

The control rod and its operating mechanism are shown in the "down" position, that is when the reactor is shut down, with the clad steel segment 20 facing the core of the reactor. In operation, the motor is energized to cause the pinion 49 to move the rack 41 and the yoke 28 downwardly whereupon the nut 27 drives the screw 30 to rotate the shaft 29 which in turn rotates the control rod shaft 11 to present the reflector 22 to the core of the reactor. Such movement of the nut elongates the upper bellows 32 to tension the same and shortens the lower bellows 31 to compress the same, whereby energy is stored in the bellows tending to return the nut, the shaft, and the control rod to the "down" position.

Thus, in the event there is a power failure, the clutch 50 will be de-energized to permit slip between its faces, whereby the energy stored in the bellows acts like a spring and raises the nut to shut down the reactor. In this matter, the mechanism assures that the control rod 15 fails safe.

In normal operation, the linear applied motion may be either up or down in small increments to provide for infinite control or positioning of the control rods.

From the foregoing description it will be seen that the present invention provides mechanism for positioning the control rod of a nuclear reactor by rotating the same in small increments to attain highly accurate control. The mechanism includes elements for translating linear movement to rotary movement which are arranged in a manner to make possible the provision of an absolutely leakproof seal for the opening in the reactor wall through which the control rod drive shaft extends. By utilizing bellows or flexible tubes adapted to store energy, the mechanism will fail safe. All this is accomplished in a simple, practical and economical manner.

While the mechanism is shown in upright position, and on top of the reactor, it can be readily modified to place the same in a horizontal position or any desired intermediate position between vertical and horizontal or in an inverted vertical position at the bottom of the reactor.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

Mechanism for rotating the control rod of a nuclear reactor comprising a support including a tube having apertured plates secured to the ends thereof, a collar projecting inwardly of said tube and sealed in one of said end plates of said support, said collar having an integral portion thereof projecting outwardly of said tube and including means for sealing about an opening in the wall of the reactor vessel, tie rods having one end secured to said end plate having said collar sealed therein, a disc secured to the other end of said tie rods and being supported thereby, a yoke slidably supported and restrained against rotary movement by said tie rods and having reversible drive means attached thereto and extending through said other end plate, a motion transmitting nut secured to said yoke and positioned between said collar and said disc, a shaft having a screw at one end for cooperating with said nut and having its other end extending through said collar for coupling the same to the control rod, said reversible drive means cooperating with said yoke for moving said yoke in an axial direction to cause said nut to effect rotary movement of said shaft, a first flexible bellows sealing tube surrounding said shaft and being expansible along the longitudinal axis thereof parallel to the axis of said shaft, one end of said first flexible bellows sealing tube sealed to the end of said collar projecting inwardly of said tube and the other end sealed to the end of said nut facing said collar, a second flexible bellows sealing tube surrounding said shaft and being expansible along the longitudinal axis thereof parallel to the axis of said shaft, said second flexible bellows sealing tube spaced along said shaft from said first flexible bellows sealing tube and having one end thereof sealed to said disc and the other end sealed to the other end of said nut whereby upon linear movement of said nut from an initial to a predetermined position relative to said shaft by said reversible drive means said first flexible bellows sealing tube is compressed and said second flexible bellows sealing tube is tensioned and cooperate by virtue of such compression and tensioning of said first and second flexible bellows sealing tubes to return said nut from the predetermined position to the initial position upon failure of said reversible drive means thus rotating said control rod from a position to permit operation of the reactor to a position causing deactivation of the reactor.

References Cited in the file of this patent

UNITED STATES PATENTS

| | | |
|---|---|---|
| 337,056 | Gibbins | Mar. 2, 1886 |
| 1,511,049 | Cederquist | Oct. 7, 1924 |
| 2,482,568 | Werner | Sept. 20, 1949 |
| 2,756,857 | McCorkle | July 31, 1956 |
| 2,782,941 | Lichtenberger et al. | Feb. 26, 1957 |
| 2,852,458 | Dietrich | Sept. 16, 1958 |
| 2,898,281 | Untermyer | Apr. 4, 1959 |

FOREIGN PATENTS

| | | |
|---|---|---|
| 233,011 | Switzerland | Oct. 2, 1944 |